United States Patent [19]

Turner

[11] 4,101,142
[45] Jul. 18, 1978

[54] SNOW SLED TURNING MECHANISM

[76] Inventor: Richard W. Turner, 1786 Tubbs St., Thousand Oaks, Calif. 91360

[21] Appl. No.: 669,238

[22] Filed: Mar. 22, 1976

[51] Int. Cl.² .............................................. B62B 13/10
[52] U.S. Cl. .................................... 280/16; 280/21 R
[58] Field of Search ...................... 280/21 R, 21 A, 25, 280/26, 16, 17; 180/5 R; 9/310 B, 310 C

[56] References Cited

U.S. PATENT DOCUMENTS

| | | | |
|---|---|---|---|
| 485,345 | 11/1892 | Gibson | 280/16 X |
| 2,358,817 | 9/1944 | Meehan | 280/25 X |
| 3,504,752 | 4/1970 | Milward | 280/16 X |
| 3,623,563 | 11/1971 | Gostomski | 280/25 X |
| 3,759,537 | 9/1973 | Schreiber | 280/21 A X |
| 3,900,208 | 8/1975 | Hjelmquist | 280/21 R X |
| 3,931,862 | 1/1976 | Cote | 180/5 R |

Primary Examiner—Bruce H. Stoner, Jr.
Assistant Examiner—Michael J. Forman
Attorney, Agent, or Firm—Boniard I. Brown

[57] ABSTRACT

A snow sled having a front steering ski rotatably and pivotally mounted on the front end of the sled body in such a way that the ski is turnable by the sled rider to steer the sled, and that turning of the ski in either direction from its center position effects tilting of the ski about its longitudinal axis to present in plow-like fashion the bottom surface of the ski in the direction of sled movement for enhancing the steering action of the ski. The sled is also equipped with a novel braking arrangement operable by the rider.

2 Claims, 9 Drawing Figures

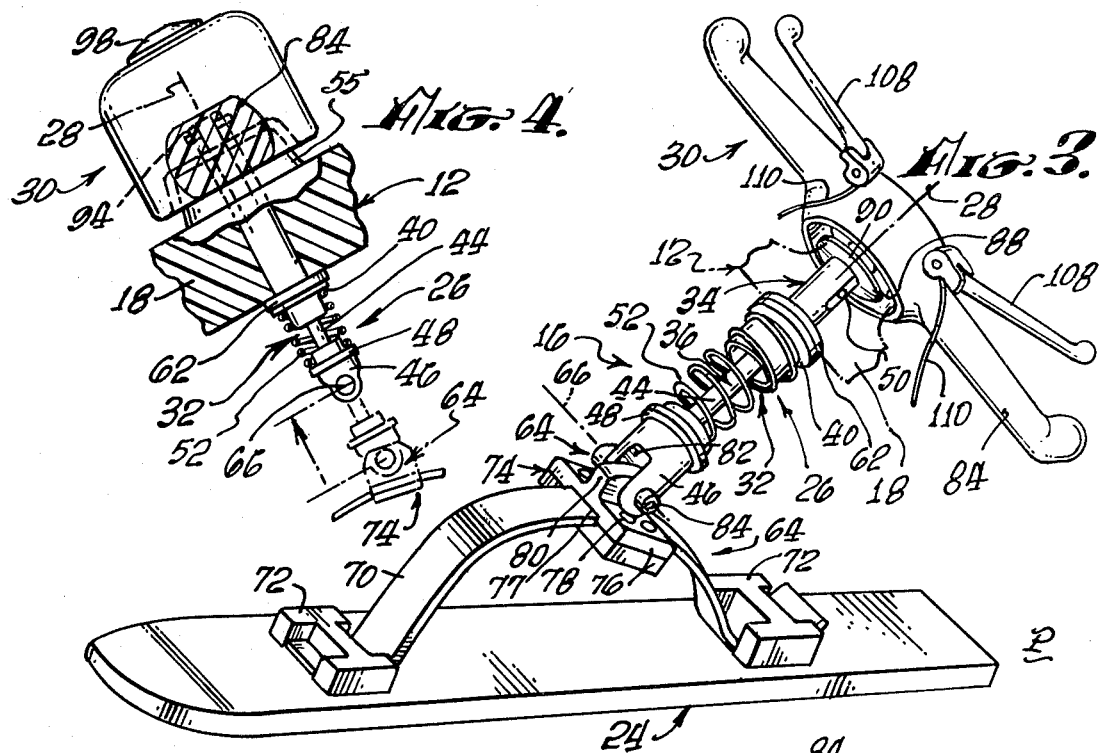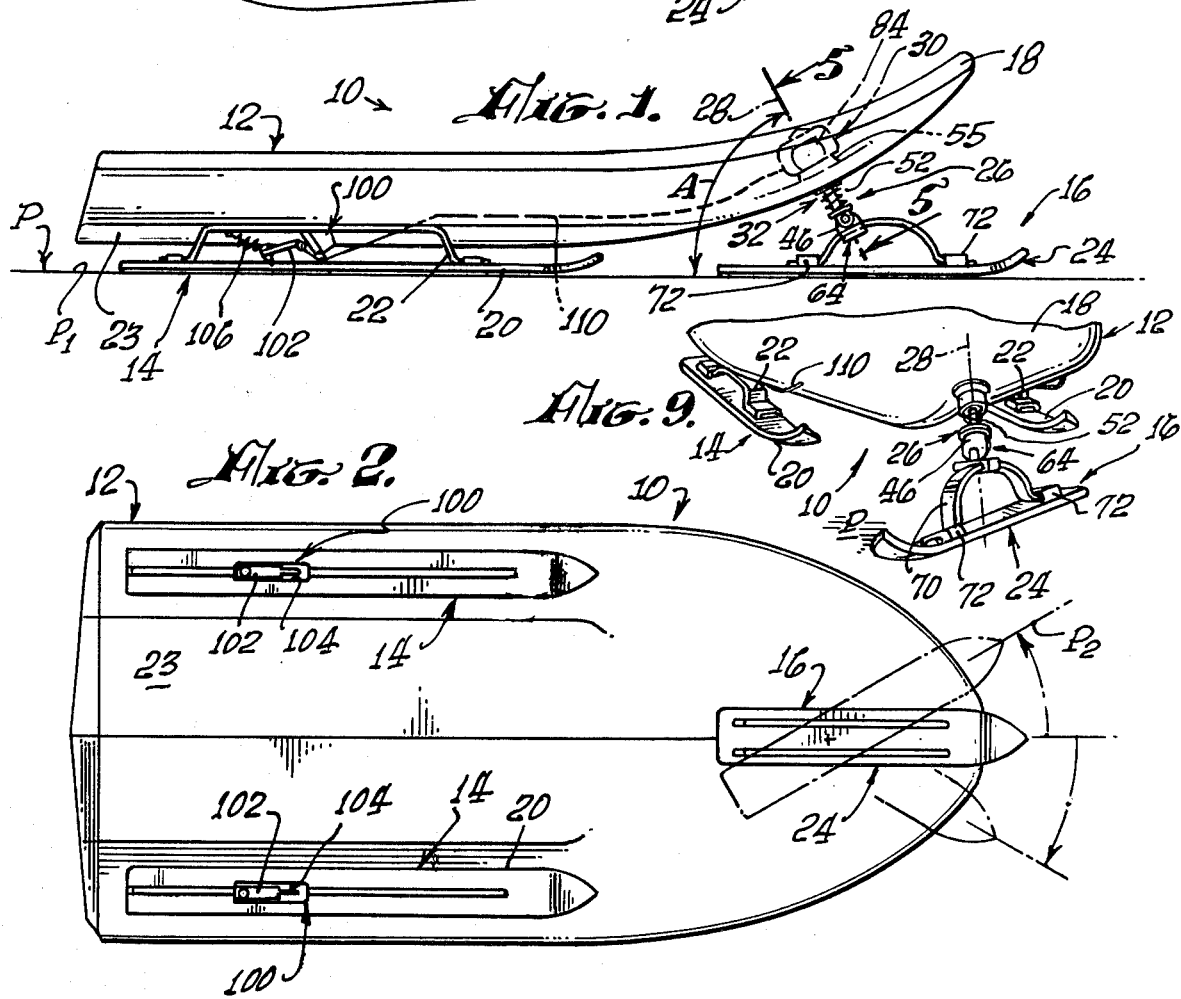

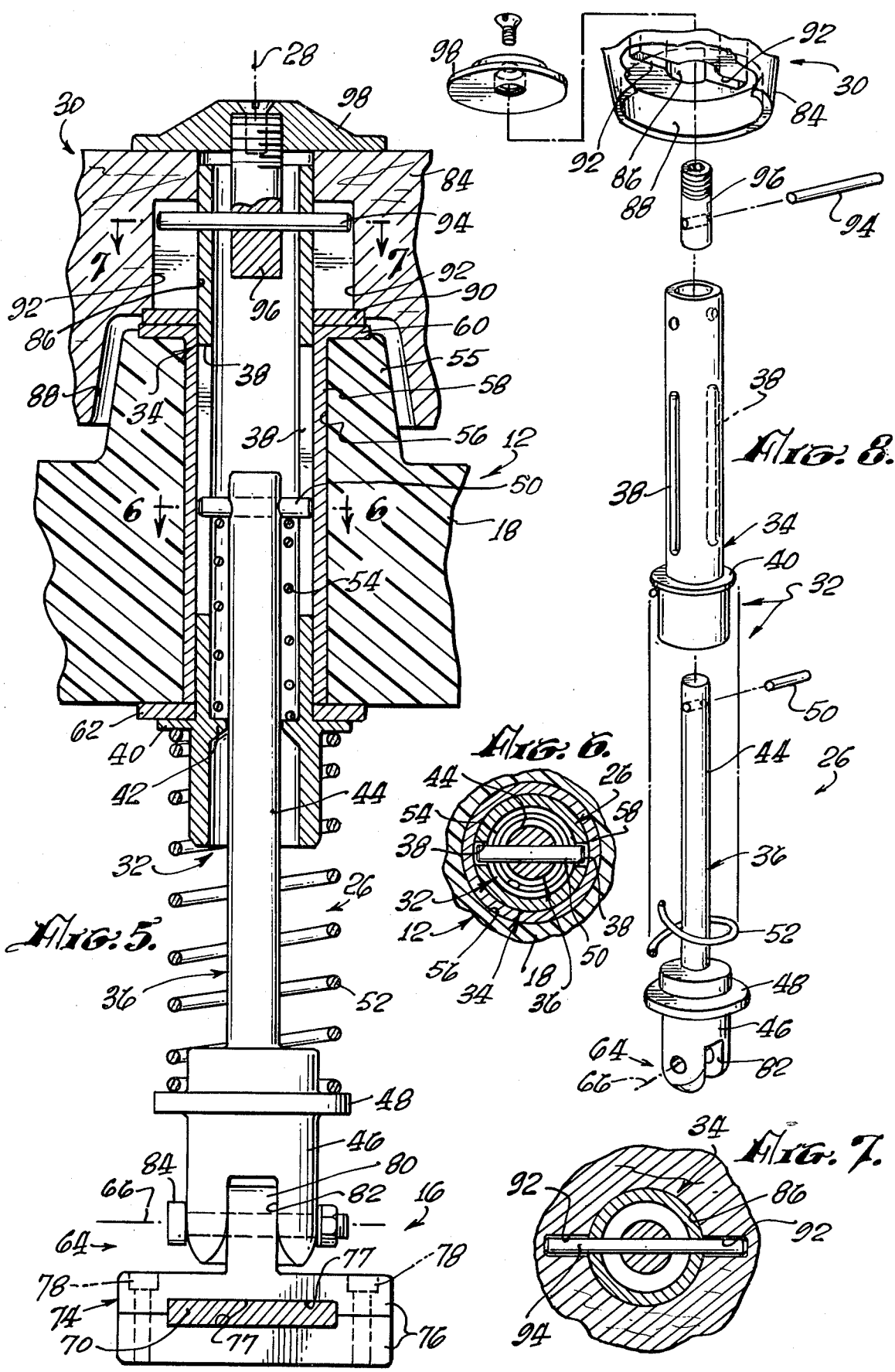

SNOW SLED TURNING MECHANISM

BACKGROUND OF THE INVENTION

1. Field of the Invention

This invention relates generally to snow vehicles and more particularly to a snow sled having a novel steering ski arrangement for steering the sled and a novel brake arrangement for braking the sled.

2. Discussion of the Prior Art

Snow sledding is a popular winter activity for children and adults alike. A variety of snow sledding vehicles have been devised, such as two runner sleds, toboggans and the like. Toboggans are widely used but are quite difficult if not impossible to steer. Conventional sleds have a front steering bar which is pivotally mounted on the front end of the sled body and connected to the runners in such a way that turning of the bar twists the front ends of the runners for steering the sled. While some degree of steering is possible with this sled steering arrangement, the maximum turning radius is relatively large. Accordingly, it is impossible to make any sharp turns or effectively maneuver such a sled.

SUMMARY OF THE INVENTION

This invention provides a snow sled with a novel front steering ski assembly which achieves improved sled steering and maneuvering capability. The sled has a body with surface means, such as runners, at its underside for slidably supporting the body on snow. The front steering ski assembly includes a steering ski which is rotatably and pivotally mounted on the sled body for turning movement relative to the body by the sled rider to steer the sled and pivotal movement relative to the body in such a way that turning of the ski in either direction from its central position effects tilting of the ski about its longitudinal axis relative to the body to present in plow-like fashion the bottom surface of the ski in the direction of sled movement. This tilting of the ski as it turns causes the ski to assume an angled plow-like attitude in which the reaction force of the snow against the bottom ski surface produces a large turning moment or torque on the sled. As a consequence, the sled may be steered more effectively and through much sharper turns than conventional sleds.

In the particular sled embodiment described, the steering assembly includes a steering shaft having upper and lower telescoping sections. The upper section is rotatably supported on the front end of the sled body on an axis which inclines forwardly in the downward direction along the axis. The lower shaft section is rotatable with and movable axially relative to the upper section. The steering ski is pivotally joined to the lower end of the lower shaft section on a pivot axis parallel to the bottom ski surface and transverse to both the steering shaft axis and the longitudinal axis of the ski, whereby as the ski is turned by rotation of the steering shaft with the ski resting on snow, the ski tilts relative to the sled body, as mentioned, to assume a plow-like attitude relative to the direction of sled movement. A steering member is secured to the upper end of the upper steering shaft section for turning of the ski to steer the sled by the sled rider.

Another aspect of the invention is concerned with a novel brake arrangement for the sled including brake members mounted on the sled runners and operable by the rider to and from braking positions wherein the members project beyond the lower runner surfaces.

BRIEF DESCRIPTION OF THE DRAWINGS

FIG. 1 is a side elevation of a preferred snow sled according to the invention;

FIG. 2 is a bottom view of the sled;

FIG. 3 is an enlarged perspective view of the improved steering ski assembly of the sled;

FIG. 4 is a section through the sled showing the steering assembly and its spring action;

FIG. 5 is an enlarged section taken on line 5—5 in FIG. 1;

FIG. 6 is a section taken on line 6—6 in FIG. 5;

FIG. 7 is a section taken on line 7—7 in FIG. 5;

FIG. 8 is a fragmentary exploded perspective view of the steering assembly; and

FIG. 9 illustrates a novel steering action of the steering assembly.

DESCRIPTION OF THE PREFERRED EMBODIMENT

Referring first to FIGS. 1 and 2, the illustrated snow sled 10 of the invention comprises a sled body 12 having means 14 at its underside for slidably supporting the body on snow and a front steering ski assembly 16 operable by the sled rider for steering the sled. The sled body has a generally hull like shape which may be molded from a suitable plastic. As shown in the drawings, the front portion of the body is tapered and upturned to provide the body with an upswept front end 18. The body is sized and shaped to support a rider in a prone position on his stomach with his head forward.

The illustrated body means 14 comprises a pair of ski-like runners 20 which extend along opposite sides of the body 12 adjacent its rear end. Each runner has an upturned front end and is attached to the underside of the body by a relatively long mounting bracket 22 which is secured at its ends to the runner and between its ends to the body. The runner mounting brackets may be designed to provide a spring support for the sled body. The bottom surfaces of the runners are located in a common plane $P_1$ parallel to the rear, generally flat rear end portion 23 of the sled body.

The steering ski assembly 16 constitutes one important feature of the invention. Broadly stated, this steering assembly comprises a steering ski 24, means 26 supporting the ski on the front end 18 of the sled body 12 for turning movement relative to the body on an axis 28 transverse to the plane $P_1$ and the bottom surface of the steering ski for steering the sled, and steering means 30 connected to the ski and operable by the sled rider for turning the ski to steer. In this regard, it will be recalled that the rider lies prone on the sled with his head forward, such that he may grasp the steering means to steer the sled.

The steering ski assembly 16 will now be described in greater detail by reference to FIGS. 3–9. The steering assembly comprises a steering shaft 32 including telescoping upper and lower sections 34, 36. The upper shaft section 34 is a tube or sleeve having a pair of diametrically opposed longitudinal slots 38 adjacent its upper end and a shoulder flange 40 near its lower end. Within the upper shaft section 34 near the flange 40 is an inner bearing shoulder 42. The lower shaft section 36 comprises an upper rod section 44 and a lower enlarged cylindrical head 46 with an annular shoulder flange 48. Rod section 44 extends axially into the lower end of the upper shaft section 34 and slidably through the central opening in the bearing shoulder 42. Extending through the upper end of the rod section 44 of the lower shaft section 36 and through the slots 38 in the upper shaft 34 is a cross pin 50 which keeps the shaft sections against relative rotation an interconnects the shaft sections for limited relative axial movement. Acting between the shoulder flanges 40, 48 on and surrounding the shaft sections 34, 36 is a compression spring 52 which urges the lower section downwardly relative to the upper section. Acting between the upper shaft section shoulder 42 and the lower shaft section cross pin 50 is a compression spring 54 having a lower spring rate than spring 52 which urges the lower shaft section upwardly relative to the upper spring. Springs 52, 54 thus position the shaft sections axially relative to one another.

Extending through a boss 55 at the upswept front end 18 of the sled body 12 on an axis (axis 28) located substantially in a plane normal to the runner plane P and containing the longitudinal centerline of the body is a bore 56. The axis of the bore inclines forwardly in the downward direction along the axis at an angle A relative to the sled runner plane P. Fitted within the body bore 56 is a bushing sleeve 58 having an upper end flange 60 which seats in a recess in the upper face of the body boss 55.

The upper steering shaft section 34 extends rotatably through and beyond the upper end of the bushing sleeve 58. Between the lower end of the bushing sleeve and the shoulder flange 40 of the upper shaft section is a bearing washer 62 against which the flange seats and which seats, in turn, against the lower end of the bushing and the underside of the sled body. From this description, it will be understood that the steering shaft 32 is rotatably mounted on the upswept front end 18 of the sled body 12 for turning on an axis (axis 28) which inclines forwardly in the downward direction along the shaft.

The steering ski 24 is attached to the lower end of the lower steering shaft section 36 by pivotal connecting means 64 for turning of the ski with the steering shaft 32 on the inclined shaft axis 28 and pivoting of the ski relative to the shaft on a pivot axis 66 parallel to the bottom surface of the ski and transverse to both the steering shaft axis 28 and the longitudinal axis of the ski. Pivotal connecting means 64 comprises an arcuate upwardly arching stirrup 70 on the ski 24 formed by a metal strap whose ends are rigidly secured to the ski by clamp blocks 72 bolted to the ski. Mounted on this stirrup for adjustment therealong is a clamp 74 comprising a pair of clamp plates 76 which straddle and are grooved at 77 to receive the stirrup and are joined by bolts 78 which are tightened to firmly secure the clamp to the stirrup. Along the upper side of the upper clamp plate 76 is an upstanding tongue 80 located on a longitudinal plane of the ski 24. This tongue fits within a slot 82 entering the lower end of the lower steering shaft head 46 in a plane containing the shaft axis 28 and is pivotally attached to the head, on the pivot axis 66, by a pivot 84. The clamp 74 is adjusted along the stirrup 70 to a position wherein the bottom surface of the ski is located in the plane $P_1$ of the sled runners 20 when the ski occupies its center position shown in solid lines in FIGS. 1 and 2.

The pivotal mounting of the ski 24 enables the ski to follow variations in the snow surface or terrain, thereby facilitating improved and more positive steering by the rider.

The sled steering means 30 comprises a steering member or handle 84 in the form of a handle bar. As shown best in FIG. 5, the handle bar 84 has a bore 86 midway between its ends which receives the upper end of the upper steering shaft section 34 and is counter bored at 88 to receive the sled boss 55. Positioned on the shaft section 34 between the shaft bushing flange 60 and the steering handle bar is a washer 99 which seats in a recess in the shoulder formed at the juncture of the bore 86 and counterbore 88.

Extending through the upper end of the upper steering shaft section 34 and into slots 92 at opposite sides of the handle bar bore 86 is a cross pin 94. This cross pin keys the handle bar 30 to the steering shaft 32 for turning of the shaft by the handle bar. The handle bar is secured to the steering shaft by a threaded stud 96 which is mounted in the cross pin 94 and a retainer cap 98 which is threaded on the outer end of the stud and presses against the outerside of the handle bar to clamp the latter and its bearing washer 90 firmly but rotatably between the cap and bushing flange 60.

From the foregoing description, it will be understood that the steering ski 24 is turnable about the steering shaft axis 28 by the handle bar 30. This turning movement of the ski is depicted in solid and broken lines in FIG. 2 and is obvi effective to steer the sled. This steering action of the ski is enhanced appreciably by virtue of the inclination of the steering shaft axis and the pivotal mounting of the ski on the steering shaft 32. Thus, throughout the full range of turning movement of the ski by the handle bar 30 to steer the sled, the bottom surface of the steering ski remains perpendicular to the plane $P_2$ containing the steering shaft axis and the longitudinal axis of the ski. For convenience, this plane is hereafter referred to as the steering plane. In the center position of the ski shown in full lines in FIGS. 1 and 2, this steering plane is perpendicular to the sled runner plane $P_1$ and contains the longitudinal axis of the sled body 12. Accordingly, when the ski is in its center position, it may orient itself about its pivot axis 66 in a position wherein the bottom ski surface parallels the sled runner plane $P_1$ and the snow surface.

Turning of the steering ski 24 in either direction from its center position by the steering shaft 32 results in rotation or canting of the steering plane $P_2$ relative to the sled runner plane $P_1$ until at a 90° steering angle (in which the steering plane is normal to the plane of the paper in FIG. 1) the steering plane is inclined to the sled runner plane $P_1$ at the same angle A as the steering shaft axis 28. Since the bottom surface of the ski remains perpendicular to the steering plane, the ski surface is effectively rotated about the longitudinal axis of the ski relative to the sled runner plane as the ski is turned in either direction from its center position. This rotation or tilting of the ski about its longitudinal axis is illustrated in FIG. 1 and occurs in such a way that the bottom ski surface is presented forwardly in plow-like fashion in the direction of sled movement. The ski remains free to pivot on its axis 66, of course, and thereby remains in contact with the snow along its full length.

Operation of the snow sled 10 is now obvious. Thus, the sled body 12 is slidably supported on snow by the sled runners 14 and steering ski 24. The rider steers the sled by turning the handlebar 30 to turn the ski. Turning of the ski in either direction from its center position to steer the sled results in tilting of the ski about its longitudinal axis, as shown in FIG. 9, such that the ski presents its bottom surface forwardly in plow-like fashion in the direction of ski movement, whereby the snow produces a large reaction force on the ski and thereby a large turning moment on the sled. Accordingly, the improved steering assembly of the invention permits steering of the sled in relatively sharp turns and thereby effective maneuvering of the sled.

The pivotal connection of the steering ski 24 to the steering shaft 42 permits pivoting of the ski to follow the contour of the snow surface in any angular position of the ski. The lower steering shaft section 36 is positioned axially by the springs 52, 54 in such a way that the lower shaft section is yieldable upwardly against the action of spring 52, as shown in FIG. 4, to provide a cushioning action. The springs 52, 54 thus serve to prevent transmission of vibration and chatter to steering handle 30, thus providing for improved steering control by the rider.

According to another feature of the invention, the sled is equipped with braking means 100 operable by the sled rider. This braking means comprises brake members 102 pivotally mounted on the sled runner brackets 22 for movement between retracted positions shown in FIG. 1 and extended braking positions wherein the brake members project below the runners 20 through holes 104 in the runners. The brake members are normally retracted by springs 106 and are extended by brake levers 108 which are pivotally mounted on the handle bar 30 and connected to the brake members by cables 110 in such a way that actuation of the levers extends the brake members to braking position against the action of the brake return springs 106.

The Inventor claims:
1. A snow sled comprising:
 a sled body adapted to support a rider,
 a pair of runners along opposite sides of said body adjacent the rear end thereof and having coplanar bottom snow engaging surfaces for slidably supporting said sled body on snow,
 a steering ski at the front end of said body having a lower snow engaging surface,
 means supporting said ski on said body for turning movement relative to said body comprising a steering shaft extending through the front end of said body with the longitudinal axis of the shaft disposed substantially in a plane normal to the common plane of said runner surfaces and aligned approximately with the longitudinal center line of said body, and with said axis sloping forwardly toward its lower end, bearing means on said body supporting said shaft for rotation on said axis, an arcuate stirrup extending lengthwise of and fixed at its ends to said ski and arching upwardly from said ski between said stirrup ends, a clamp adjustable along and adapted to be secured in adjusted position along said stirrup, and means pivotally connecting the lower end of said shaft to said clamp for turning of said ski with said shaft about said shaft axis and pivotal movement of said ski relative to said shaft about a pivot axis parallel to said ski surface and transverse to both said shaft axis and the longitudinal axis of said ski,
 a steering member connected to the upper end of said shaft and operable by the rider for turning said ski,
 said steering shaft comprising upper and lower telescoping sections, a cross pin extending through the upper end of said lower shaft section and into longitudinal slots in said upper shaft section so as to connect said shaft sections of rotation of the sections in unison and relative axial movement of the sections, a first compression spring surrounding the upper end of said lower shaft section and seating against said cross pin and a seat in said upper shaft section for urging said lower section upwardly relative to said upper shaft section, and a second compression spring surrounding the lower end of said lower shaft section and seating against shoulders on said shaft sections for urging said lower section downwardly relative to said upper section,
 said bearing means comprising radial and thrust bearing means supporting said upper shaft section or rotation and against axial movement relative to said body, and
 said ski and steering member being connected to the lower end of said lower shaft section and the upper end of said upper shaft section, respectively.
2. A sled according to claim 1 including:
 brake members pivotally mounted on said runners for movement to and from braking positions wherein said brake members project below said runner surfaces, and
 means on said steering member connected by flexible means to said brake members and operable by the rider for effecting movement of said brake members to and from said braking positions.

* * * * *